US012763015B2

(12) United States Patent
Yoon

(10) Patent No.: US 12,763,015 B2
(45) Date of Patent: Oct. 13, 2026

(54) DISPLAY APPARATUS

(71) Applicant: LG DISPLAY CO., LTD., Seoul (KR)

(72) Inventor: Sanghun Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 120 days.

(21) Appl. No.: 18/422,053

(22) Filed: Jan. 25, 2024

(65) Prior Publication Data

US 2024/0249682 A1 Jul. 25, 2024

(30) Foreign Application Priority Data

Jan. 25, 2023 (KR) ........................ 10-2023-0009282

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0847* (2013.01); *G09G 2330/021* (2013.01)

(58) Field of Classification Search
CPC .................................................... G09G 3/3233
See application file for complete search history.

(56) References Cited

U.S. PATENT DOCUMENTS

2015/0356924 A1* 12/2015 Chen .................... G09G 3/3291 345/77
2019/0096327 A1* 3/2019 Peng .................... G09G 3/3241
2019/0147799 A1* 5/2019 Kim ..................... H10K 50/828 345/55
2022/0051627 A1* 2/2022 Yang .................... G09G 3/3233
2022/0108655 A1* 4/2022 Yu ......................... G09G 3/3233
2022/0383811 A1* 12/2022 Liu ...................... H10K 59/123

FOREIGN PATENT DOCUMENTS

KR 10-2022-0052747 A 4/2022

* cited by examiner

*Primary Examiner* — William Boddie
*Assistant Examiner* — Alecia D English
(74) *Attorney, Agent, or Firm* — Fish & Richardson P.C.

(57) ABSTRACT

A display apparatus includes a driving transistor including a gate electrode, and a first electrode for receiving a high-potential driving voltage and a second electrode for providing a driving current to a light emitting element, a first transistor including a gate electrode to which a light emitting control signal is applied, a first electrode connected to the second electrode of the driving transistor, and a second electrode connected to an anode electrode of the light emitting element, a second transistor including a gate electrode to which the light emitting control signal or a scanning signal is applied, and a first electrode for receiving an initialization voltage and a second electrode, and a compensation transistor including a gate electrode to which a compensation scan signal is applied, a first electrode connected to the second electrode of the second transistor, and a second electrode connected to the anode electrode of the light emitting element, and when the compensation scan signal at a low level is applied, the compensation transistor is turned on.

17 Claims, 9 Drawing Sheets

DISPLAY APPARATUS

CROSS-REFERENCE TO RELATED APPLICATION

The present application claims the priority of Korean Patent Application No. 10-2023-0009282, filed on Jan. 25, 2023, which is hereby incorporated by reference in its entirety.

BACKGROUND

Field of the Disclosure

The present disclosure relates to a display apparatus.

Description of the Background

As the information society develops, various demands for display apparatuses for displaying images are increasing, and various types of display apparatuses such as a liquid crystal display and an organic light emitting diode display are utilized.

Images displayed on a display apparatus may be still images or moving images, and the moving image may include various types such as sports images, game images, and movies. The display apparatus is driven in a variable refresh rate (VRR) mode in which a driving frequency varies depending on the type of an image, thereby reducing power consumption and extending the lifespan of the display apparatus.

When the variable refresh rate mode is applied to drive pixel circuits at various refresh rates, a luminance difference occurs between the pixel circuits due to different refresh rates, thereby causing quality degradation such as image distortion or flicker.

SUMMARY

Accordingly, the present disclosure is directed to a display apparatus that substantially obviates one or more of problems due to limitations and disadvantages described above.

More specifically, the present disclosure is to provide a display apparatus with an improved abnormal light emitting phenomenon.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display apparatus includes a driving transistor including a gate electrode, and a first electrode for receiving a high-potential driving voltage and a second electrode for providing a driving current to a light emitting element, a first transistor including a gate electrode to which a light emitting control signal is applied, a first electrode connected to the second electrode of the driving transistor, and a second electrode connected to an anode electrode of the light emitting element, a second transistor including a gate electrode to which the light emitting control signal or a scanning signal is applied, and a first electrode for receiving an initialization voltage and a second electrode, and a compensation transistor including a gate electrode to which a compensation scan signal is applied, a first electrode connected to the second electrode of the second transistor, and a second electrode connected to the anode electrode of the light emitting element, and when the compensation scan signal at a low level is applied, the compensation transistor is turned on.

In another aspect of the present disclosure, a display apparatus includes a driving transistor including a gate electrode, and a first electrode configured to receive a high-potential driving voltage and a second electrode configured to provide a driving current to a light emitting element, a first transistor including a gate electrode to which a light emitting control signal is applied, a first electrode connected to the second electrode of the driving transistor, and a second electrode connected to an anode electrode of the light emitting element, and a second transistor including a gate electrode to which a compensation scan signal is applied, a first electrode configured to receive an initialization voltage, and a second electrode connected to the anode electrode, wherein when the compensation scan signal at a low level is applied, the second transistor is turned on.

According to various aspects of the present disclosure, it is possible to prevent the occurrence of the abnormal light emitting phenomenon in the light emitting period due to the abnormal increase in the potential of the anode electrode of the light emitting element before the light emitting period.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
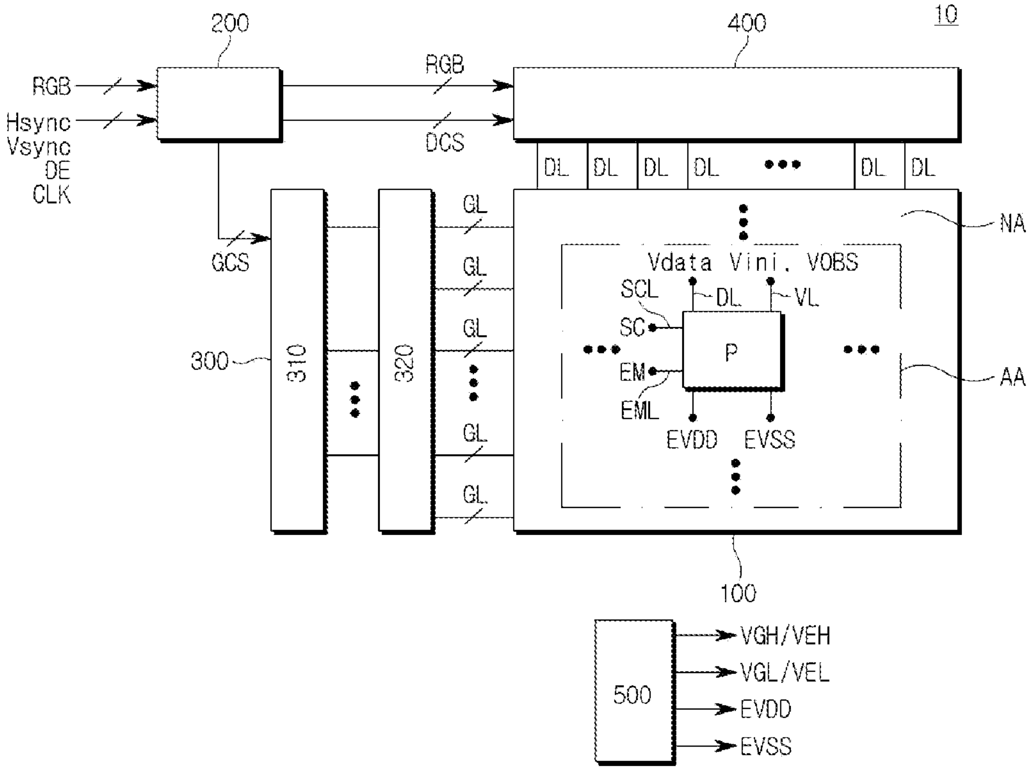
FIG. 1 is a block diagram schematically illustrating a display apparatus according to an aspect of the present disclosure.

Hereinafter, embodiments will be described with reference to the accompanying drawings. In the specification, when a first component (or an area, a layer, a portion, or the like) is described as "on," "connected," or "coupled to" a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term "and/or" includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular expression includes the plural expression unless the context clearly dictates otherwise.

Terms such as "under," "at a lower side," "above," and "at an upper side" are used to describe the relationship between the components illustrated in the drawings. The terms are relative concepts and are described with respect to directions marked in the drawings.

It should be understood that term such as "includes" or "has" is intended to specify the presence of features, numbers, steps, operations, components, parts, or a combination thereof described in the specification and does not preclude the presence or addition possibility of one or more other features, numbers, steps, operations, components, parts, or combinations thereof in advance.

FIG. 1 is a block diagram schematically illustrating a display apparatus according to one aspect of the present disclosure.

Referring to FIG. 1, a display apparatus 10 includes a display panel 100 including a plurality of pixels P, a controller 200, a gate driving unit 300 for supplying gate signals to each of the plurality of pixels P, a data driving unit 400 for supplying data signals to each of the plurality of pixels P, and a power supply unit 500 for supplying power required for driving each of the plurality of pixels P.

The display panel 100 includes a display area AA (see FIG. 2) in which the pixel P is positioned and a non-display area NA (see FIG. 2) which is disposed to surround the display area AA and in which the gate driving unit 300 and the data driving unit 400 are disposed.

In the display panel 100, a plurality of gate lines GL and a plurality of data lines DL cross each other, and each of the plurality of pixels P is connected to the gate line GL and the data line DL. Specifically, one pixel P receives the gate signals from the gate driving unit 300 through the gate line GL, receives data signals from the data driving unit 400 through the data line DL, and receives a high-potential driving voltage EVDD and a low-potential driving voltage EVSS from the power supply unit 500.

Here, a scan signal SC and a light emitting control signal EM are supplied through the gate line GL, and a data voltage Vdata is supplied through the data line DL. In addition, according to various embodiments, the gate line GL may include a plurality of scan lines SCL through which the scan signal SC is supplied and a light emitting control signal line EML through which the light emitting control signal EM is supplied. In addition, the plurality of pixels P may additionally include a power supply line VL to receive a bias voltage VOBS and initialization voltages VAR and Vini.

Figure 2:
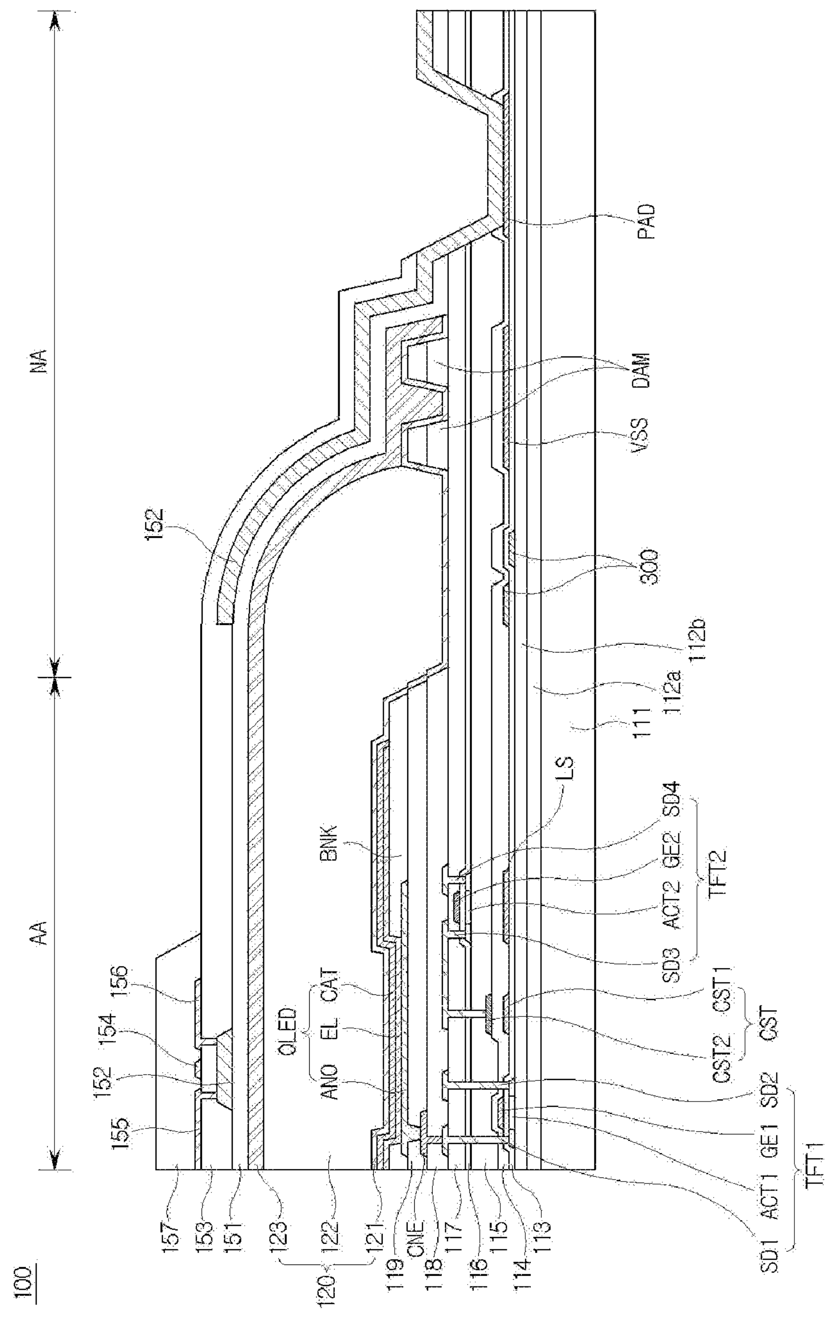
FIG. 2 is a cross-sectional view illustrating a stacked form of the display apparatus according to an aspect of the present disclosure.

In addition, as illustrated in FIG. 2, each of the pixels P includes a light emitting element OLED and a pixel circuit for controlling the driving of the light emitting element OLED. Here, the light emitting element OLED includes an anode electrode ANO, a cathode electrode CAT, and a light emitting layer EL between the anode electrode ANO and the cathode electrode CAT.

The pixel circuit includes a plurality of switching elements, a driving element, and a capacitor. Here, the switching element and the driving element may be formed of thin film transistors. In the pixel circuit, the driving element adjusts the amount of light emitted from the light emitting element EL by controlling the amount of current supplied to the light emitting element EL according to the data voltage. In addition, the plurality of switching elements operate the pixel circuits after receiving the scan signals SC supplied through the plurality of scan lines SCL and the light emitting control signal EM supplied through the light emitting control line EML.

The display panel 100 may be implemented as a non-transmissive display panel or a transmissive display panel. The transmissive display panel may be applied to a transparent display apparatus in which an image is displayed on a screen and a real object in the background is visible. The display panel 100 may be manufactured as a flexible display panel. The flexible display panel may be implemented as an organic light emitting diode (OLED) panel using a plastic substrate.

Each of the pixels P may be divided into a red pixel, a green pixel, and a blue pixel to implement colors. Each of the pixels P may further include a white pixel. Each of the pixels P includes the pixel circuit.

Touch sensors may be disposed on the display panel 100. Touch input may be detected by using separate touch sensors or detected through the pixels P. The touch sensors are on-cell type or add-on type touch sensors and may be implemented as an in-cell type touch sensors disposed on the screen of the display panel or embedded into the display panel 100.

The controller 200 processes image data RGB input from the outside to fit a size and a resolution of the display panel 100 and supplies the processed image data RGB to the data driving unit 400. The controller 200 generates a gate control signal GCS and a data control signal DCS using synchronization signals, for example, a dot clock signal CLK, a data enable signal DE, a horizontal synchronization signal Hsync, and a vertical synchronization signal Vsync input from the outside. The gate driving unit 300 and the data driving unit 400 are controlled by supplying the generated gate control signal GCS and data control signal DCS to the gate driving unit 300 and the data driving unit 400, respectively.

The controller 200 may be configured by being coupled to various processors, for example, a microprocessor, a mobile processor, an application processor, and the like depending on a device to be mounted.

A host system may be any one of a television (TV) system, a set-top box, a navigation system, a personal computer (PC), a home theater system, a mobile device, a wearable device, and a vehicle system.

The controller 200 may control operation timings of a display panel driving unit at a frame frequency of an input frame frequency Xi (i is a positive integer greater than zero) Hz by multiplying the input frame frequency by i times. The input frame frequency is 60 Hz in a national television standards committee (NTSC) type and 50 Hz in a phase-alternating line (PAL) type.

The controller 200 generates signals so that the pixel P may be driven at various refresh rates. In other words, the controller 200 generates signals associated with driving so that the pixel P is driven in a variable refresh rate (VRR) mode or to be switched between a first refresh rate and a second refresh rate. For example, the controller 200 may drive the pixel P at various refresh rates by simply changing rates of clock signals, generating synchronization signals to generate a horizontal blank or a vertical blank, or driving the gate driving unit 300 by a mask method.

The controller 200 generates the gate control signal GCS for controlling an operation timing of the gate driving unit 300 and the data control signal DCS for controlling an operation timing of the data driving unit 400 based on timing signals Vsync, Hsync, and DE received from the host system. The controller 200 synchronizes the gate driving unit 300 and the data driving unit 400 by controlling the operation timings of the display panel driving unit.

A voltage level of the gate control signal GCS output from the controller 200 may be converted into gate-on voltages VGL and VEL and gate-off voltages VGH and VEH through a level shifter (not illustrated) and supplied to the gate driving unit 300. The level shifter converts a low level voltage of the gate control signal GCS into the gate low voltage VGL and converts a high level voltage of the gate control signal GCS into the gate high voltage VGH. The gate control signal GCS includes a start pulse and a shift clock.

The gate driving unit 300 supplies the scan signal SC to the gate line GL according to the gate control signal GCS supplied from the controller 200. The gate driving unit 300 may be disposed at one side or both sides of the display panel 100 by a gate in panel (GIP) method.

The gate driving unit 300 sequentially outputs the gate signals to the plurality of gate lines GL under the control of the controller 200. The gate driving unit 300 may shift the gate signals using the shift register to sequentially supply the signals to the gate lines GL.

The gate signal may include the scan signal SC and the light emitting control signal EM in an OLED display device. The scan signal SC includes a scan pulse that swings between the gate-on voltage VGL and the gate-off voltage VGH. The light emitting control signal EM may include a light emitting control signal pulse that swings between the gate-on voltage VEL and the gate-off voltage VEH.

The scan pulse is synchronized with the data voltage Vdata to select pixels P in a line in which data is written. The light emitting control signal EM defines light emitting times of the pixels P.

The gate driving unit 300 may include a light emitting control signal driver 310 and at least one scan driver 320.

The light emitting control signal driver 310 outputs the light emitting control signal pulse in response to the start pulse and the shift clock from the controller 200 and sequentially shifts the light emitting control signal pulse according to the shift clock.

At least one scan driver 320 outputs the scan pulse in response to the start pulse and the shift clock from the controller 200 and shifts the scan pulse according to a shift clock timing.

The data driving unit 400 converts the image data RGB into the data voltage Vdata according to the data control signal DCS supplied from the controller 200 and supplies the converted data voltage Vdata to the pixel P through the data line DL.

In FIG. 1, the data driving unit 400 is illustrated as being disposed at one side of the display panel 100 as a single data driving unit, but the number and arrangement positions of data driving units 400 are not limited thereto.

In other words, the data driving unit 400 may be formed of a plurality of integrated circuits (IC) and disposed separately as a plurality of data driving units at one side of the display panel 100.

The power supply unit 500 generates direct current (DC) power required for driving a pixel array and the display panel driving unit of the display panel 100 using a DC-DC converter. The DC-DC converter may include a charge pump, a regulator, a buck converter, a boost converter, and the like. The power supply unit 500 may receive a DC input voltage applied from the host system (not illustrated) and generate DC voltages such as the gate-on voltage VGL and VEL, the gate-off voltages VGH and VEH, the high-potential driving voltage EVDD, and the low-potential driving voltage EVSS. The gate-on voltages VGL and VEL and the gate-off voltages VGH and VEH are supplied to the level shifter (not illustrated) and the gate driving unit 300. The high-potential driving voltage EVDD and the low-potential driving voltage EVSS are commonly supplied to the pixels P.

FIG. 2 is a cross-sectional view illustrating a stacked form of the display apparatus according to one aspect.

FIG. 2 is a cross-sectional view including two switching thin film transistors TFT1 and TFT2 and one capacitor CST. The two thin film transistors TFT1 and TFT2 include any one thin film transistor of a switching thin film transistor and a driving transistor including a polycrystalline semiconductor material and the oxide thin film transistor including an oxide semiconductor material. In this case, the thin film transistor including the polycrystalline semiconductor material is referred to as the polycrystalline thin film transistor TFT1, and the thin film transistor including the oxide semiconductor material is referred to as the oxide thin film transistor TFT2.

The polycrystalline thin film transistor TFT1 illustrated in FIG. 2 is an emission switching thin film transistor connected to a light emitting element OLED, and the oxide thin film transistor TFT2 is a switching thin film transistor connected to a capacitor CST.

One pixel P includes the light emitting element OLED and a pixel driving circuit for applying a driving current to the light emitting element OLED. The pixel driving circuit is disposed on a substrate 111, and the light emitting element OLED is disposed on the pixel driving circuit. In addition, an encapsulation layer 120 is disposed on the light emitting element OLED. The encapsulation layer 120 protects the light emitting element OLED.

The pixel driving circuit may indicate one pixel P array unit including a driving thin film transistor, a switching thin film transistor, and a capacitor. In addition, the light emitting element OLED may indicate an array unit for light emission including an anode electrode, a cathode electrode, and a light emitting layer disposed therebetween.

In one aspect, the driving thin film transistor and at least one switching thin film transistor use an oxide semiconductor as an active layer. The thin film transistor using the oxide semiconductor material as an active layer has the excellent leakage current blocking effect and has the relatively inexpensive manufacturing cost compared to the thin film transistor using the polycrystalline semiconductor material as the active layer. Therefore, to reduce power consumption and reduce the manufacturing cost, the pixel driving circuit according to one aspect includes the driving thin film transistor and at least one switching thin film transistor, which use the oxide semiconductor material.

All of the thin film transistors constituting the pixel driving circuit may be implemented by using the oxide semiconductor material, and only some of the switching thin film transistors may be implemented by using the oxide semiconductor material.

However, since it is difficult to secure the reliability of the thin film transistor using the oxide semiconductor material and the thin film transistor using the polycrystalline semiconductor material has a fast operation speed and excellent reliability, in one aspect, the switching thin film transistor using the oxide semiconductor material and the switching thin film transistor using the polycrystalline semiconductor material are all included.

The substrate 111 may be formed of a multi-layer in which organic and inorganic films are alternately stacked. For example, the substrate 111 may include the organic film such as polyimide and the inorganic film such as silicon oxide ($SiO_2$), which are alternately stacked.

A lower buffer layer 112*a* is formed on the substrate 111. The lower buffer layer 112*a* is intended to block moisture or the like that may be introduced from the outside and may be used by stacking a plurality of silicon oxide ($SiO_2$) layers or the like. An auxiliary buffer layer 112*b* may be further disposed on the lower buffer layer 112*a* to protect the elements from the introduction of moisture.

The polycrystalline thin film transistor TFT1 is formed on the substrate 111. The polycrystalline thin film transistor TFT1 may use the polycrystalline semiconductor as the active layer. The polycrystalline thin film transistor TFT1 includes a first active layer ACT1 including a channel through which electrons or holes move, a first gate electrode GE1, a first source electrode SD1, and a first drain electrode SD2.

The first active layer ACT1 includes a first channel area, a first source area disposed at one side thereof and a first drain area disposed at the other side thereof, with the first channel area interposed therebetween.

The first source area and the first drain area are areas electrically conducted by an intrinsic polycrystalline semiconductor material doped with a group 5 or group 3 impurity ion, for example, phosphorus (P) or boron (B) at a predetermined concentration. The first channel area is an area in which the polycrystalline semiconductor material maintains an intrinsic state and provides a path through which electrons or holes move.

Meanwhile, the polycrystalline thin film transistor TFT1 includes the first gate electrode GE1 overlapping the first channel area of the first active layer ACT1. A first gate insulating layer 113 is disposed between the first gate electrode GE1 and the first active layer ACT1. The first gate insulating layer 113 may be formed by stacking one inorganic layer or a plurality of inorganic layers, such as a silicon oxide ($SiO_2$) film and a silicon nitride ($SiN_x$) film.

In one aspect, the polycrystalline thin film transistor TFT1 has a top gate structure in which the first gate electrode GE1 is positioned above the first active layer ACT1. Therefore, a first electrode CST1 included in the capacitor CST and a light shielding layer LS included in the oxide thin film transistor TFT2 may be made of the same material as the first gate electrode GE1. It is possible to reduce the number of mask processes by forming the first gate electrode GE1, the first electrode CST1, and the light shielding layer LS through one mask process.

The first gate electrode GE1 is made of a metal material. For example, the first gate electrode GE1 may be formed of one layer or a plurality of layers made of one of molybdenum (Mo), aluminum (Al), chromium (Cr), gold (Au), titanium (Ti), nickel (Ni), neodymium (Nd), and copper (Cu) or an alloy thereof, but is not limited thereto.

A first interlayer insulating layer 114 is disposed on the first gate electrode GE1. The first interlayer insulating layer 114 may be made of silicon oxide ($SiO_2$), silicon nitride ($SiN_x$), or the like.

The display panel 100 may further include an upper buffer layer 115, a second gate insulating layer 116, and a second interlayer insulating layer 117 sequentially disposed on the first interlayer insulating layer 114, and the polycrystalline thin film transistor TFT1 includes the first source electrode SD1 and the first drain electrode SD2 formed on the second interlayer insulating layer 117 and connected to the first source area and the first drain area, respectively.

The first source electrode SD1 and the first drain electrode SD2 may be formed of one layer or a plurality of layers made of one of molybdenum (Mo), aluminum (Al), chromium (Cr), gold (Au), titanium (Ti), nickel (Ni), and neodymium (Nd) or an alloy thereof, but is not limited thereto.

The upper buffer layer 115 separates a second active layer ACT2 of the oxide thin film transistor TFT2 made of the oxide semiconductor material from the first active layer ACT1 made of the polycrystalline semiconductor material and provides the base capable of forming the second active layer ACT2.

The second gate insulating layer 116 covers the second active layer ACT2 of the oxide thin film transistor TFT2. Since the second gate insulating layer 116 is formed on the second active layer ACT2 made of the oxide semiconductor material, the second gate insulating layer 116 is implemented as an inorganic film. For example, the second gate insulating layer 116 may be made of silicon oxide ($SiO_2$), silicon nitride ($SiN_x$), or the like.

The second gate electrode GE2 is made of a metal material. For example, the second gate electrode GE2 may be formed of one layer or a plurality of layers made of any one of molybdenum (Mo), aluminum (Al), chromium (Cr), gold (Au), titanium (Ti), nickel (Ni), neodymium (Nd), and copper (Cu) or an alloy thereof, but is not limited thereto.

Meanwhile, the oxide thin film transistor TFT2 includes the second active layer ACT2 formed on the upper buffer layer 115 and made of the oxide semiconductor material, the second gate electrode GE2 disposed on the second gate insulating layer 116, and a second source electrode SD3 and a second drain electrode SD4 disposed on the second interlayer insulating layer 117.

The second active layer ACT2 includes an intrinsic second channel area made of the oxide semiconductor material and not doped with impurities and a second source area and a second drain area electrically conducted by being doped with impurities.

The oxide thin film transistor TFT2 further includes the light shielding layer LS positioned under the upper buffer layer 115 and overlapping the second active layer ACT2. The light shielding layer LS may secure the reliability of the oxide thin film transistor TFT2 by shielding light entering the second active layer ACT2. The light shielding layer LS may be made of the same material as the first gate electrode GE1 and formed on an upper surface of the first gate insulating layer 113. The light shielding layer LS may be electrically connected to the second gate electrode GE2 to form a dual gate.

The second source electrode SD3 and the second drain electrode SD4 may be formed on the second interlayer insulating layer 117 with the same material simultaneously together with the first source electrode SD1 and the first drain electrode SD2, thereby reducing the number of mask processes.

Meanwhile, the capacitor CST may be implemented by arranging a second electrode CST2 on the first interlayer insulating layer 114 to overlap the first electrode CST1. The second electrode CST2 may be formed of one layer or a plurality of layer, for example, made of any one of molybdenum (Mo), aluminum (Al), chromium (Cr), gold (Au), titanium (Ti), nickel (Ni), neodymium (Nd), and copper (Cu) or an alloy thereof.

The capacitor CST stores the data voltage applied through the data line DL for a predetermined period and then provides the data voltage to the light emitting element OLED. The capacitor CST includes two electrodes corresponding to each other and a dielectric disposed therebetween. The first interlayer insulating layer 114 is positioned between the first electrode CST1 and the second electrode CST2.

The first electrode CST1 or the second electrode CST2 of the capacitor CST may be electrically connected to the second source electrode SD3 or the second drain electrode SD4 of the oxide thin film transistor TFT2. However, the present disclosure is not limited thereto, and the connection relationship of the capacitor CST may vary depending on the pixel driving circuit.

Meanwhile, a first planarization layer 118 and a second planarization layer 119 are sequentially disposed on the pixel driving circuit to planarize an upper end of the pixel driving circuit. The first planarization layer 118 and the second planarization layer 119 may be formed of an organic film such as polyimide or acrylic resin.

In addition, the light emitting element OLED is formed on the second planarization layer 119.

The light emitting element OLED includes an anode electrode ANO, a cathode electrode CAT, and a light emitting layer EL disposed between the anode electrode ANO and the cathode electrode CAT. When the pixel driving circuit commonly using the low-potential voltage connected to the cathode electrode CAT is implemented, the anode electrode ANO is disposed as a separate electrode for each sub-pixel. When the pixel driving circuit commonly using the high-potential voltage is implemented, the cathode electrode CAT may be disposed as a separate electrode for each sub-pixel.

The light emitting element OLED is electrically connected to the driving element through a central electrode CNE disposed on the first planarization layer 118. Specifically, the anode electrode ANO of the light emitting element OLED and the first source electrode SD1 of the polycrystalline thin film transistor TFT1 forming the pixel driving circuit are connected by the central electrode CNE.

The anode electrode ANO is connected to the central electrode CNE exposed through a contact hole passing through the second planarization layer 119. In addition, the central electrode CNE is connected to the first source electrode SD1 exposed through a contact hole passing through the first planarization layer 118.

The central electrode CNE functions as a medium connecting the first source electrode SD1 to the anode electrode ANO. The central electrode CNE may be made of a conductive material such as copper (Cu), silver (Ag), molybdenum (Mo), or titanium (Ti).

The anode electrode ANO may be formed in a multi-layer structure including a transparent conductive film and an opaque conductive film with high reflection efficiency. The transparent conductive film may be made of a material with a relatively greater work function value, such as indium-tin-oxide (ITO) and indium-zinc-oxide (IZO), and the opaque conductive layer may be formed in a one layer or multi-layer structure containing aluminum (Al), silver (Ag), copper (Cu), lead (Pb), molybdenum (Mo), titanium (Ti), or an alloy thereof. For example, the anode electrode ANO may be formed in a structure in which the transparent conductive film, the opaque conductive film, and the transparent conductive film are sequentially stacked or formed in a structure in which the transparent conductive film and the opaque conductive film are sequentially stacked.

The light emitting layer EL is formed by stacking a hole-related layer, an organic light emitting layer, and an electron-related layer on the anode electrode ANO sequentially or in reverse order.

A bank layer BNK may be a pixel defining film that exposes the anode electrode ANO of each pixel P. The bank layer BNK may be made of an opaque material (e.g., black matrix) to prevent light interference between adjacent pixels P. In this case, the bank layer BNK includes a light shielding material made of at least any one of color pigment, organic black, and carbon. A spacer may be further disposed on the bank layer BNK.

The cathode electrode CAT faces the anode electrode ANO with the light emitting layer EL interposed therebetween and is formed on an upper surface and a side surface of the light emitting layer EL. The cathode electrode CAT may be formed integrally throughout the display area AA. When applied to a top emission type OLED display device, the cathode electrode CAT may be formed of a transparent conductive film such as ITO or IZO.

The encapsulation layer 120 for suppressing the introduction of moisture may be further disposed on the cathode electrode CAT.

The encapsulation layer 120 may block the introduction of external moisture or oxygen into the light emitting element OLED vulnerable to external moisture or oxygen. To this end, the encapsulation layer 120 may include at least one inorganic encapsulation layer and at least one layer organic encapsulation layer, but is not limited thereto. In the present disclosure, a structure of the encapsulation layer 120 in which a first encapsulation layer 121, a second encapsulation layer 122, and a third encapsulation layer 123 are sequentially stacked will be described as an example.

The first encapsulation layer 121 is formed on the substrate 111 on which the cathode electrode CAT is formed. The third encapsulation layer 123 may be formed on the substrate 111 on which the second encapsulation layer 122 is formed and formed to surround an upper surface, a lower surface, and a side surface of the second encapsulation layer 122 together with the first encapsulation layer 121. The first encapsulation layer 121 and the third encapsulation layer 123 may minimize or prevent external moisture or oxygen from flowing into the light emitting element OLED. The first encapsulation layer 121 and the third encapsulation layer 123 may be made of an inorganic insulating material capable of low-temperature deposition, such as silicon nitride ($SiN_x$), silicon oxide ($SiO_x$), silicon oxynitride (SiON), and aluminum oxide ($Al_2O_3$). Since the first encapsulation layer 121 and the third encapsulation layer 123 are deposited in a low temperature atmosphere, it is possible to prevent damage to the light emitting element OLED vulnerable to a high temperature atmosphere in a deposition process of the first encapsulation layer 121 and the third encapsulation layer 123.

The second encapsulation layer 122 may function as a buffer for mitigating stress between the layers due to the bending of the display apparatus 10 and planarize step differences between the layers. The second encapsulation layer 122 may be formed on the substrate 111 on which the first encapsulation layer 121 is formed with a non-photosensitive organic insulating material such as acrylic resin, epoxy resin, phenolic resin, polyamide resin, polyimide resin, and polyethylene or silicon oxycarbon (SiOC), or a photosensitive organic insulating material such as photoacrylic, but is not limited thereto. When the second encapsulation layer 122 is formed through an inkjet method, a dam DAM may be disposed to prevent the second encapsulation layer 122 in a liquid form from spreading to an edge of the substrate 111. The dam DAM may be disposed closer to the edge of the substrate 111 than the second encapsulation layer 122. The dam DAM may prevent the second encapsulation layer 122 from spreading to a pad area in which a conductive pad disposed at an outermost side of the substrate 111 is disposed.

The dam DAM may be designed to prevent the spreading of the second encapsulation layer 122, but when the second encapsulation layer 122 is formed to exceed a height of the dam DAM in the process, the second encapsulation layer 122, which is an organic layer, may be exposed to the outside, and thus moisture or the like may easily flow into the light emitting element. Therefore, to prevent this, at least 10 dams DAM may be formed to overlap each other.

The dam DAM may be disposed on the second interlayer insulating layer 117 in the non-display area NA.

In addition, the dam DAM may be formed simultaneously with the first planarization layer 118 and the second planarization layer 119. When the first planarization layer 118 is formed, a lower layer of the dam DAM may be formed together, and when the second planarization layer 119 is formed, an upper layer of the dam DAM may be formed together, and thus the dam DAM may be formed by being stacked in a double structure.

Therefore, the dam DAM may be made of the same material as the first planarization layer 118 and the second planarization layer 119, but is not limited thereto.

The dam DAM may be formed to overlap a low-potential driving power supply line VSS. For example, the low-potential driving power supply line VSS may be formed on a lower layer of the area in which the dam DAM is positioned in the non-display area NA.

The low-potential driving power supply line VSS and the gate driving unit 300 formed in the form of the GIP may be formed in the form of surrounding an outer side of the display panel, and the low-potential driving power supply line VSS may be positioned outside the gate driving unit 300. In addition, the low-potential driving power supply line VSS may be connected to the cathode electrode CAT, and a common voltage may be applied thereto. The gate driving unit 300 is simply illustrated in plan and cross-sectional views, but may be formed by using a thin film transistor with the same structure as the thin film transistor in the display area AA.

The low-potential driving power supply line VSS is disposed outside the gate driving unit 300. The low-potential driving power supply line VSS is disposed outside the gate driving unit 300 and surrounds the display area AA. For example, the low-potential driving power supply line VSS may be made of the same material as the first gate electrode GE1, but is not limited thereto, and may be made of the same material as the second electrode CST2 or the first source and drain electrodes SD1 and SD2, but is not limited thereto.

In addition, the low-potential driving power supply line VSS may be electrically connected to the cathode electrode CAT. The low-potential driving power supply line VSS may supply the low-potential driving voltage EVSS to the plurality of pixels P in the display area AA.

A touch layer may be disposed on the encapsulation layer 120. In the touch layer, a touch buffer film 151 may be positioned between a touch sensor metal including touch electrode connection lines 152 and 154 and touch electrodes 155 and 156 and the cathode electrode CAT of the light emitting element OLED.

The touch buffer film 151 may block a chemical solution (developer, etchant, or the like) used in a process of manufacturing the touch sensor metal disposed on the touch buffer film 151 or external moisture or the like from flowing into the light emitting layer EL including the organic material. Therefore, the touch buffer film 151 may prevent damage to the light emitting layer EL vulnerable to a chemical solution or moisture.

The touch buffer film 151 may be formed at a predetermined temperature (e.g., a low temperature of 100° C. or lower) and made of an organic insulating material with a low dielectric constant of 1 to 3 to prevent damage to the light emitting layer EL including an organic material vulnerable to high temperatures. For example, the touch buffer film 151 may be made of an acrylic-based, epoxy-based, or siloxan-based material. The touch buffer film 151 made of an organic insulating material and having planarization performance may prevent damage to the encapsulation layer 120 due to the bending of the OLED display device and cracking of the touch sensor metal formed on the touch buffer film 151.

According to the mutual-capacitance-based touch sensor structure, the touch electrodes 155 and 156 may be disposed on the touch buffer film 151, and the touch electrodes 155 and 156 may be disposed to cross each other.

The touch electrode connection lines 152 and 154 may electrically connect the touch electrodes 155 and 156. The touch electrode connection lines 152 and 154 and the touch electrodes 155 and 156 may be positioned on different layers with the touch insulating film 153 interposed therebetween.

The touch electrode connection lines 152 and 154 may be disposed to overlap the bank layer BNK, thereby preventing a reduction in an aperture ratio.

Meanwhile, a portion of the touch electrode connection line 152 may be electrically connected to the touch driving circuit (not illustrated) through a touch pad after passing an upper portion and a side surface of the encapsulation layer 120 and an upper portion and a side surface of the dam DAM.

The portion of the touch electrode connection line 152 may transmit the touch driving signal to the touch electrodes 155 and 156 after receiving a touch driving signal from the touch driving circuit and transmit touch sensing signals from the touch electrodes 155 and 156 to the touch driving circuit.

A touch protective layer 157 may be disposed on the touch electrodes 155 and 156. In the drawing, the touch protective layer 157 is illustrated as being disposed only on the touch electrodes 155 and 156, but is not limited thereto, and the touch protective layer 157 may extend to an area before or after the dam DAM and may be disposed on the touch electrode connection line 152.

In addition, a color filter (not illustrated) may be further disposed on the encapsulation layer 120, and the color filter may be positioned on the touch layer or positioned between the encapsulation layer 120 and the touch layer.

Figure 3:
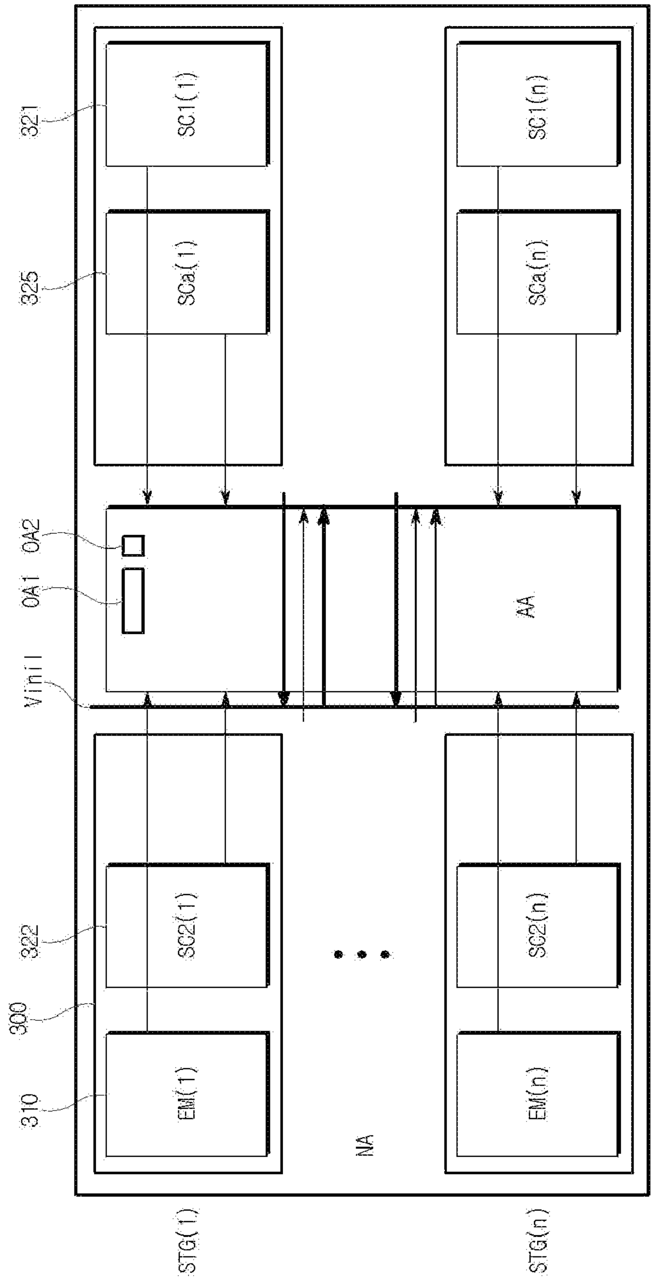
FIG. 3 is a view illustrating a configuration of a gate driving unit in the display apparatus according to an aspect of the present disclosure.

FIG. 3 is a view illustrating a configuration of a gate driving unit in the display apparatus according to one aspect.

Referring to FIG. 3, the gate driving unit 300 includes a light emitting control signal driver 310 and a scan driver 320. The scan driver 320 may include a first scan driver 321, a second scan driver 322, and a compensation scan driver 325. In addition, in some embodiments, the second scan driver 322 may include odd-numbered second scan drivers and even-numbered second scan drivers, but is not limited thereto.

The gate driving unit 300 may have shift registers formed symmetrically at both sides of the display area AA. In addition, in the gate driving unit 300, the shift register at one side of the display area AA may include the second scan driver 322 and the light emitting control signal driver 310, and the shift register at the other side of the display area AA may include the compensation scan driver 325 and the first scan driver 321. However, the present disclosure is not limited thereto, and the light emitting control signal driver 310, the first scan driver 321, the second scan driver 322, and the compensation scan driver 325 may be disposed differently according to the embodiments.

Stages STG1 to STGn of the shift register may include first scan signal generators SC1(1) to SC1(*n*), second scan signal generators SC2(1) to SC2(*n*), compensation scan signal generators SCa(1) to SCa(n), and light emitting control signal generators EM(1) to EM(n), respectively.

The first scan signal generators SC1(1) to SC1(*n*) output first scan signals SC1(1) to SC1(*n*) through first scan lines SCL1 of the display panel 100. The second scan signal generators SC2(1) to SC2(*n*) output second scan signals SC2(1) to SC2(*n*) through second scan lines SCL2 of the display panel 100. The compensation scan signal generators SCa(1) to SCa(n) output compensation scan signals SCa(1) to SCa(n) through compensation scan lines SCLa of the display panel 100. The light emitting control signal generators EM(1) to EM(n) output light emitting control signals EM(1) to EM(n) through light emitting control lines EML of the display panel 100.

The first scan signals SC1(1) to SC1(*n*) may be used as signals for driving an Ath transistor (e.g., a compensation transistor) included in the pixel circuit. The second scan signals SC2(1) to SC2(*n*) may be used as signals for driving a Bth transistor (e.g., a data supply transistor) included in the pixel circuit. The compensation scan signals SCa(1) to SCa(n) may be used as signals for driving a Cth transistor (e.g., an additional compensation transistor) included in the pixel circuit. The light emitting control signals EM(1) to EM(n) may be used as signals for driving an Eth transistor (e.g., a light emitting control transistor) included in the pixel circuit. For example, when the light emitting control transistors of the pixels are controlled by using the light emitting control signals EM(1) to EM(n), a light emitting time of the light emitting element varies.

Referring to FIG. 3, an initialization voltage bus line Vinil may be disposed between the gate driving unit 300 and the display area AA.

An initialization voltage Vini may be supplied to the pixel circuit from the power supply unit 500 through the initialization voltage bus line Vinil.

In the drawing, the initialization voltage bus line Vinil is illustrated as being positioned only at one of left and right sides of the display area AA, but is not limited thereto, and may be positioned at both sides thereof, and even when the initialization voltage bus line is positioned at one side, the position of the left side or the right side is not limited.

One or more optical areas OA1 and OA2 may be disposed in the display area AA.

The one or more optical areas OA1 and OA2 may be disposed to overlap one or more optical electronic devices, such as a photographing device such as a camera (image sensor) or a detection sensor such as a proximity sensor and an illuminance sensor.

The one or more optical areas OA1 and OA2 may be formed with a light transmitting structure to have a transmittance greater than or equal to a predetermined level for an operation of the optical electronic device. In other words, the number of pixels P per unit area in one or more optical areas OA1 and OA2 may be smaller than the number of pixels P per unit area in a general area except for the optical areas OA1 and OA2 in the display area AA. In other words, resolutions of the one or more optical areas OA1 and OA2 may be lower than a resolution of the general area in the display area AA.

The light transmitting structure in the one or more optical areas OA1 and OA2 may be formed by patterning the cathode electrode in a portion in which the pixel P is not disposed. In this case, the patterned cathode electrode may be removed by using a laser, or the cathode electrode may be formed by being selectively patterned by using a material such as a cathode deposition prevention layer.

In addition, the light transmitting structure in the one or more optical areas OA1 and OA2 may be formed by separately forming the light emitting element OLED and the pixel circuit in the pixel P. In other words, the light emitting element OLED of the pixel P may be positioned above the optical areas OA1 and OA2, the plurality of transistors TFTs forming the pixel circuit may be disposed around the optical areas OA1 and OA2, and the light emitting element OLED and the pixel circuit may be electrically connected through a transparent metal layer.

Figure 4:
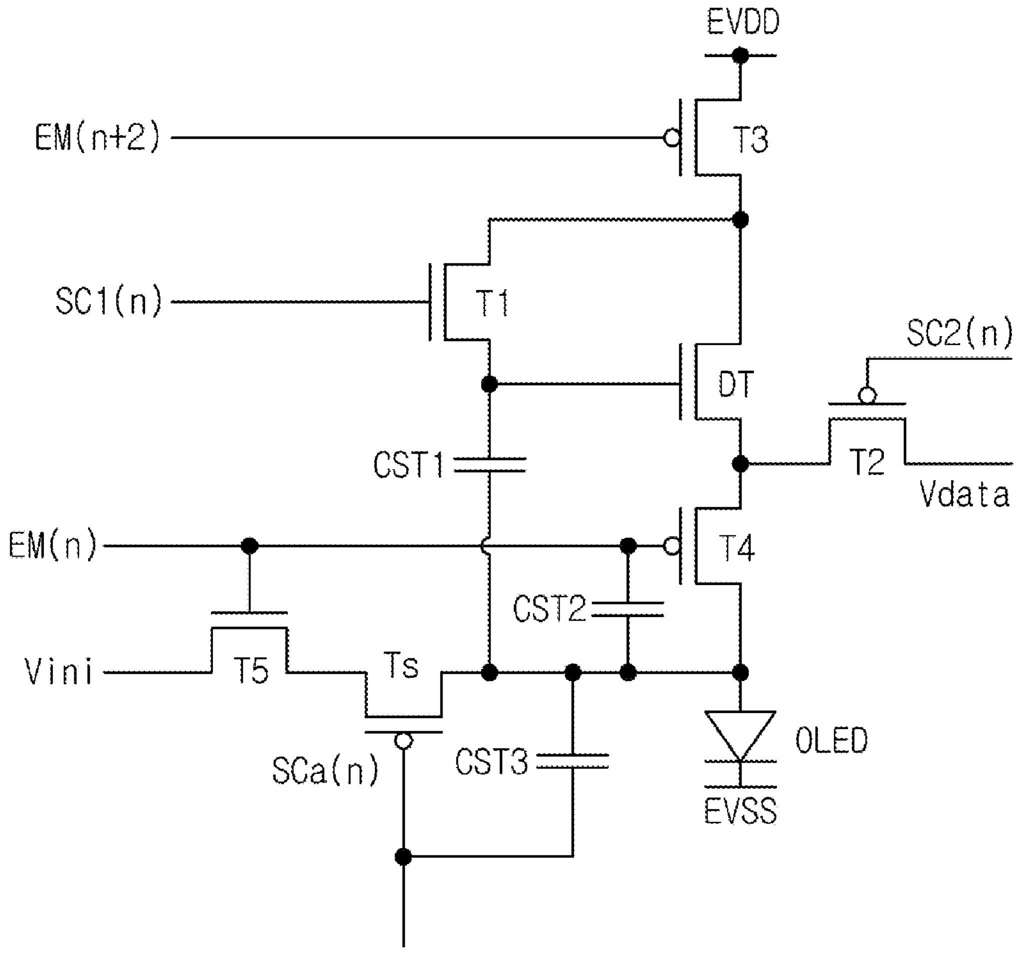
FIG. 4 is a view illustrating a pixel circuit in the display apparatus according to an aspect of the present disclosure.

FIG. 4 is a view illustrating a pixel circuit in the display apparatus according to one aspect.

FIG. 4 exemplarily illustrates the pixel circuit for description, and the present disclosure is not limited thereto as long as a structure may control the light emission of the light emitting element OLED by receiving the light emitting control signal EM (n). For example, the pixel circuit may include an additional scan signal, a switching thin film transistor connected to the additional scan signal, and a switching thin film transistor to which an additional initialization voltage is applied, and the connection relationship of the switching elements or a connection position of a capacitor may be disposed variously. Hereinafter, for convenience of description, a display apparatus having the pixel circuit structure of FIG. 4 will be described.

Referring to FIG. 4, each of the plurality of pixels P may include a pixel circuit having a driving transistor DT, and a light emitting element OLED connected to the pixel circuit.

The pixel circuit may drive the light emitting element OLED by controlling a driving current flowing in the light emitting element OLED. The pixel circuit may include the driving transistor DT, first to fifth transistors T1 to T5, a compensation transistor Ts, and a first capacitor CST1. Each of the transistors DT, T1 to T5, and Ts may include a first electrode, a second electrode, and a gate electrode. One of the first electrode and the second electrode may be a source electrode, and the other of the first electrode and the second electrode may be a drain electrode.

Each of the transistors DT, T1 to T5, and Ts may be a p-type thin film transistor or an n-type thin film transistor. In the aspect of FIG. 3, the driving transistor DT, the first transistor T1, and the fifth transistor T5 are the n-type thin film transistors, and the remaining transistors T2 to T4 and Ts are the p-type thin film transistors. However, the present disclosure is not limited thereto, and all or some of the transistors DT and T1 to T5 may be the p-type thin film transistors or the n-type thin film transistors according to the embodiments. In addition, the n-type thin film transistor may be an oxide thin film transistor, and the p-type thin film transistor may be a polycrystalline silicon thin film transistor.

Hereinafter, the driving transistor DT, the first transistor T1, and the fifth transistor T5 are the n-type thin film transistors, and the remaining transistors T2 to T4 and Ts are the p-type thin film transistors. Therefore, the driving transistor DT, the first transistor T1, and the fifth transistor T5 are turned on by receiving a high voltage, and the remaining transistors T2 to T4 and Ts are turned on by receiving a low voltage.

According to one example, the first transistor T1 forming the pixel circuit may function as a compensation transistor, the second transistor T2 may function as a data supply transistor, the third and fourth transistors T3 and T4 may function as light emitting control transistors, and the fifth transistor T5 may function as an initialization transistor.

The light emitting element OLED may include an anode electrode and a cathode electrode. The anode electrode of the light emitting element OLED may be connected to a second electrode of the fourth transistor T4, and the cathode electrode may be connected to the low-potential driving voltage EVSS.

The driving transistor DT may include a first electrode connected to a second electrode of the third transistor T3, a second electrode connected to a first electrode of the fourth transistor T4, and a gate electrode connected to a second electrode of the first transistor T1. The driving transistor DT may provide a driving current to the light emitting element OLED based on a data voltage stored in the first capacitor CST1.

The first transistor T1 may include a first electrode connected to the second electrode of the third transistor T3, a second electrode connected to the gate electrode of the driving transistor DT, and a gate electrode for receiving the first scan signal SC1(*n*). The first transistor T1 may be turned on in response to the first scan signal SC1(*n*) and diode-connected between the first electrode and the second electrode to sample a threshold voltage Vth of the driving transistor DT. The first transistor T1 may be a compensation transistor.

The first capacitor CST1 may be connected or formed between the second electrode of the first transistor T1 (or the gate electrode of the driving transistor DT) and an anode electrode of the light emitting element EL.

The second transistor T2 may include a first electrode connected to the data line DL (or for receiving the data voltage Vdata), a second electrode connected to a second electrode of the driving transistor DT (or the first electrode of the fourth transistor T4), and a gate electrode for receiving the second scan signal SC2(*n*). The second transistor T2 may be turned on in response to the second scan signal SC2(*n*) and may transmit the data voltage Vdata to the second electrode of the driving transistor DT (or the first electrode of the fourth transistor T4). The second transistor T2 may be a data supply transistor.

The third transistor T3 and the fourth transistor T4 (or the first and second light emitting control transistors) may be connected between the high-potential driving voltage EVDD and the light emitting element OLED and may form a current movement path through which the driving current generated by the driving transistor DT moves.

The third transistor T3 may include a first electrode for receiving the high-potential driving voltage EVDD, a second electrode connected to the first electrode of the driving transistor DT (or the first electrode of the first transistor T1), and a gate electrode for receiving a light emitting control signal EM(n+2).

The fourth transistor T4 may include a first electrode connected to the second electrode of the driving transistor DT (or a second electrode of the second transistor T2), a second electrode connected to a second electrode of the fifth transistor T5 (or the anode electrode of the light emitting element OLED), and a gate electrode for receiving a light emitting control signal EM(n).

Figure 6:
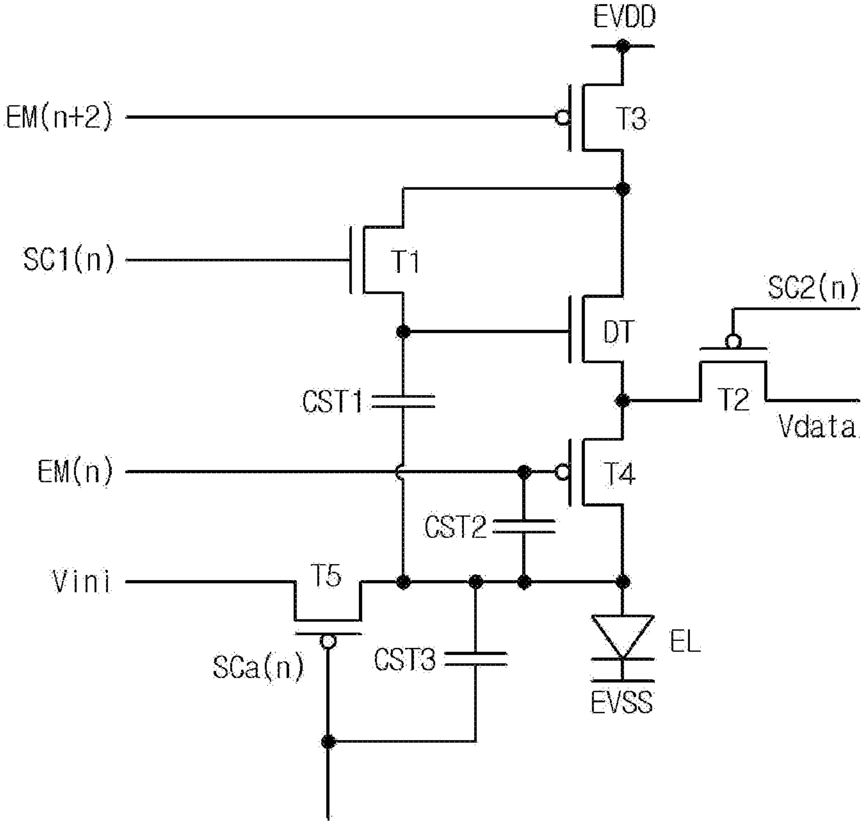
FIG. 6 is a view illustrating a pixel circuit in a display apparatus according to another aspect.

The third and fourth transistors T3 and T4 are turned on in response to the light emitting control signals EM(n+2, n), respectively, and in this case, the driving current may be provided to the light emitting element OLED, and the light emitting element OLED may emit light with luminance corresponding to the driving current. In FIG. 6, the third and fourth transistors T3 and T4 are illustrated as being turned on in response to the light emitting control signal EM(n+2, n), respectively, but are not limited thereto, and the third and fourth transistors T3 and T4 may be turned on in response to the same light emitting control signal EM(n).

The fifth transistor T5 may include a first electrode for receiving the initialization voltage Vini, a second electrode connected to the anode electrode of the light emitting element OLED (or a first electrode of the compensation transistor Ts), and a gate electrode for receiving the light emitting control signal EM(n).

The fifth transistor T5 may be turned on in response to the light emitting control signal EM(n) before the light emitting element OLED emits light (or after the light emitting element OLED emits light) and may initialize the anode electrode (or the pixel electrode) of the light emitting element OLED using the initialization voltage Vini. The light emitting element OLED may have a parasitic capacitor formed between the anode electrode and the cathode electrode. In addition, while the light emitting element OLED emits light, the parasitic capacitor may be charged so that the anode electrode of the light emitting element OLED may have a specific voltage. Therefore, the amount of charge accumulated in the light emitting element OLED may be initialized by applying the initialization voltage Vini to the anode electrode of the light emitting element OLED through the fifth transistor T5.

The compensation transistor Ts may include a first electrode connected to the second electrode of the fifth transistor T5, a second electrode connected to the anode electrode of the light emitting element OLED, and a gate electrode for receiving the compensation scan signal SCa(n). Before the light emitting period, the compensation transistor Ts may function to cancel a parasitic capacitor CST2 generated by the light emitting control signal EM(n) at a high level, which turns on the fifth transistor T5 and turns off the fourth transistor T4. For example, when the compensation transistor Ts is omitted and the second electrode of the fifth transistor T5 is directly connected to the anode electrode of the light emitting element OLED, the parasitic capacitor CST2 may be formed between the light emitting control line (see EML in FIG. 1) through which the light emitting control signal EM(n) is provided and the anode electrode. Before the light emitting period, at a time point at which the light emitting control signal EM(n) at a high level is applied, a voltage of the anode electrode of the light emitting element OLED may become higher than a voltage that turns on the light emitting element OLED by the parasitic capacitor CST2. In this case, the light emitting element OLED may unintentionally emit light before the light emitting period.

However, the display apparatus according to one aspect may further include the compensation transistor Ts between the fifth transistor T5 and the anode electrode, and before the light emitting control signal EM (n) at a high level is applied to the fourth and fifth transistors T4 and T5, the compensation scan signal SCa (n) at a low level may be applied to the compensation transistor Ts. Therefore, the compensation capacitor CST3 may be formed between the compensation scan line through which the compensation scan signal SCa (n) is provided and the anode electrode of the light emitting element OLED. A compensation capacitance of the compensation capacitor CST3 may have a different level from a parasitic capacitance of the parasitic capacitor CST2 to cancel a magnitude of the parasitic capacitance of the parasitic capacitor CST2. Therefore, before the light emitting period, since the compensation capacitor CST3 is formed to sufficiently decrease a voltage of the anode electrode of the light emitting element OLED by the compensation capacitor CST3, by maintaining the voltage of the anode electrode to be lower than the voltage that turns on the light emitting element OLED even when the voltage of the anode electrode of the light emitting element OLED is increased by the parasitic capacitor CST2, it is possible to prevent the light emitting element OLED from unintentionally emitting light before the light emitting period. Therefore, it is possible to improve the color reproducibility of the display apparatus.

Figure 5:
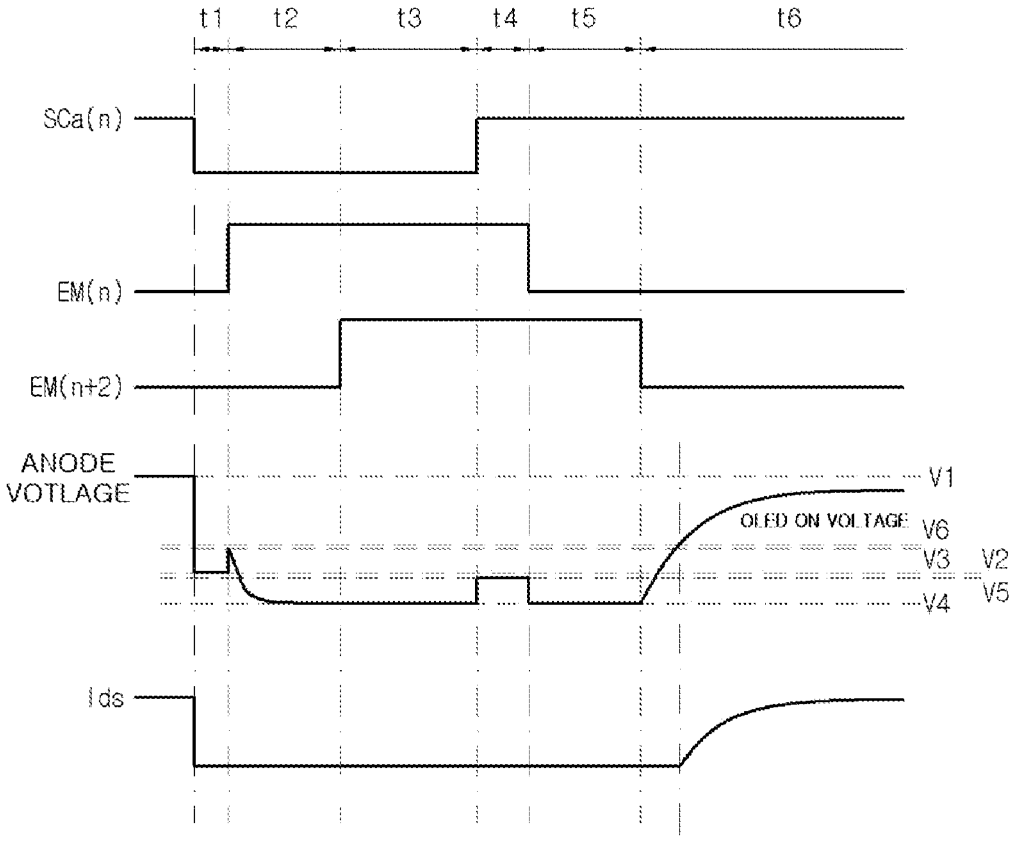
FIG. 5 is a waveform diagram illustrating signals applied to pixels of the display apparatus according to an aspect of the present disclosure.

FIG. 5 is a waveform diagram illustrating signals applied to pixels of the display apparatus according to one aspect.

Referring to FIGS. 4 and 5, the compensation scan signal SCa(n) at the low level is supplied to the compensation transistor Ts in a first period t1. The compensation transistor Ts is turned on in response to the compensation scan signal SCa(n) at the low level, and the compensation capacitor CST3 is formed between the compensation scan line and the anode electrode of the light emitting element OLED. The voltage of the anode electrode is decreased by the compensation capacitor CST3 in response to the compensation scan signal SCa(n) at the low level (first voltage level V1→second voltage level V2).

Subsequently, in a second period t2, the light emitting control signal EM(n) at the high level is supplied to the fourth and fifth transistors T4 and T5. The fifth transistor T5 is turned on in response to the light emitting control signal EM(n) at the high level, and the initialization voltage Vini is supplied through the first electrode and supplied to the anode electrode of the light emitting element OLED through the compensation transistor Ts. The initialization voltage Vini has a fourth voltage level V4. Meanwhile, in the second period t2, since the light emitting control signal EM(n) at the high level is supplied to the fourth and fifth transistors T4 and T5, the parasitic capacitor CST2 may be formed between the light emitting control signal line (see EML in FIG. 1) and the anode electrode. Due to the parasitic capacitor CST2, the voltage of the anode electrode, which is the second voltage level V2, is increased to a third voltage level V3 greater than the second voltage level V2 (V2→V3). The third voltage level V3 may be smaller than a sixth voltage level V6 of the turn-on voltage (or an OLED On voltage) of the light emitting element OLED. Since the third voltage level V3 is smaller than the sixth voltage level V6 of the turn-on voltage (or the OLED On voltage) of the light emitting element OLED, an abnormal driving current Ids may not flow even when the voltage of the anode electrode, which has the second voltage level V2, is increased to the third voltage level V3 greater than the second voltage level V2 due to the parasitic capacitor CST2 in the second period t2. The voltage of the anode electrode, which has the third voltage level V3, is gradually decreased and maintained at the fourth voltage level V4.

In a third period t3, the light emitting control signal EM(n+2) at a high level is supplied to the third transistor T3.

In a fourth period t4, the compensation scan signal SCa(n) at the high level is supplied, and the voltage of the anode electrode is increased to a fifth voltage level V5 by the compensation capacitor CST3 (V4→V5).

In a fifth period t5, the light emitting control signal EM(n) at the low level is supplied, the fourth transistor T4 is turned on in response to the light emitting control signal EM(n) at the low level, and the fifth transistor T5 is turned off. The voltage of the anode electrode is decreased from the fifth voltage level V5 to the fourth voltage level V4 by the parasitic capacitor CST2 (V5→V4).

In a sixth period t6, the light emitting control signal EM(n+2) at the low level is supplied, and the third transistor T3 is turned on in response to the light emitting control signal EM(n+2) at the low level. Since the high-potential driving voltage EVDD supplied to the first electrode of the third transistor T3 is provided to the anode electrode through the driving transistor DT and the fourth transistor T4, the voltage of the anode electrode is gradually increased, and the driving current Ids flows in the light emitting element OLED from a time at which the voltage of the anode electrode has the sixth voltage level V6 or more of the turn-on voltage (or the OLED On voltage) of the light emitting element OLED so that the light emitting element OLED emits light.

Hereinafter, other embodiments will be described.

Figure 7:
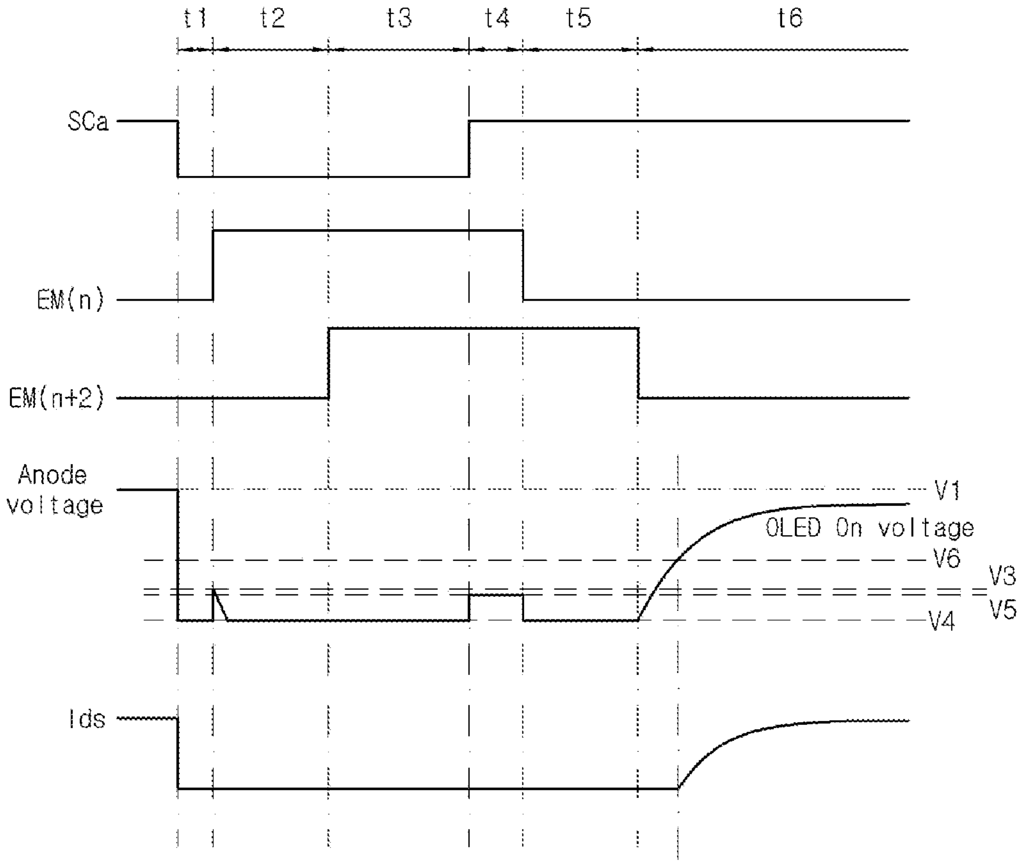
FIG. 7 is a waveform diagram illustrating signals applied to pixels of the display apparatus according to another aspect of the present disclosure.

FIG. 6 is a view illustrating a pixel circuit in a display apparatus according to another aspect. FIG. 7 is a waveform diagram illustrating signals applied to pixels of the display apparatus according to another aspect.

Referring to FIGS. 6 and 7, the display apparatus according to the present aspect differs from the display apparatus of FIGS. 4 and 5 in that the compensation transistor Ts of FIG. 4 is omitted and the compensation scan signal SCa (n) is applied to the gate electrode of the fifth transistor T5.

More specifically, in the first period t1, the compensation scan signal SCa(n) at the low level is supplied to the fifth transistor T5. The fifth transistor T5 is turned on in response to the compensation scan signal SCa(n) at the low level, and the initialization voltage Vini is provided to the anode electrode from the first electrode. In addition, the compensation capacitor CST3 is formed between the compensation scan line and the anode electrode of the light emitting element OLED. The voltage of the anode electrode is decreased in response to the compensation scan signal SCa(n) at the low level by the compensation capacitor CST3 and the initialization voltage Vini (first voltage level V1→fourth voltage level V4).

Subsequently, in a second period t2, the light emitting control signal EM(n) at the high level is supplied to the fourth and fifth transistors T4 and T5. In the second period t2, since the light emitting control signal EM(n) at the high level is supplied to the fourth transistor T4, the parasitic capacitor CST2 may be formed between the light emitting control signal line (see EML in FIG. 1) and the anode electrode. The voltage of the anode electrode, which has the fourth voltage level V4, is increased to the third voltage level V3 greater than the fourth voltage level V4 due to the parasitic capacitor CST2 (V4→V3). The third voltage level V3 may be smaller than the sixth voltage level V6 of the turn-on voltage (or the OLED On voltage) of the light emitting element OLED Since the third voltage level V3 is smaller than the sixth voltage level V6 of the turn-on voltage (or the OLED On voltage) of the light emitting element OLED, the abnormal driving current Ids may not flow even when the voltage of the anode electrode, which has the fourth voltage level V4, is increased to the third voltage level V3 greater than the fourth voltage level V4 due to the parasitic capacitor CST2 in the second period t2. The voltage of the anode electrode, which has the third voltage level V3, is decreased and maintained at the fourth voltage level V4.

In the third period t3, the light emitting control signal EM(n+2) at the high level is supplied to the third transistor T3.

In a fourth period t4, the compensation scan signal SCa(n) at the high level is supplied, and the voltage of the anode electrode is increased to a fifth voltage level V5 by the compensation capacitor CST3 (V4→V5).

In a fifth period t5, the light emitting control signal EM(n) at the low level is supplied, the fourth transistor T4 is turned on in response to the light emitting control signal EM(n) at the low level, and the fifth transistor T5 is turned off. The voltage of the anode electrode is decreased from the fifth voltage level V5 to the fourth voltage level V4 by the parasitic capacitor CST2 (V5→V4).

In a sixth period t6, the light emitting control signal EM(n+2) at the low level is supplied, and the third transistor T3 is turned on in response to the light emitting control signal EM(n+2) at the low level. Since the high-potential driving voltage EVDD supplied to the first electrode of the third transistor T3 is provided to the anode electrode through the driving transistor DT and the fourth transistor T4, the voltage of the anode electrode is gradually increased, and the driving current Ids flows in the light emitting element OLED from a time at which the voltage of the anode electrode has the sixth voltage level V6 or more of the turn-on voltage (or the OLED On voltage) of the light emitting element OLED so that the light emitting element OLED emits light.

Figure 8:
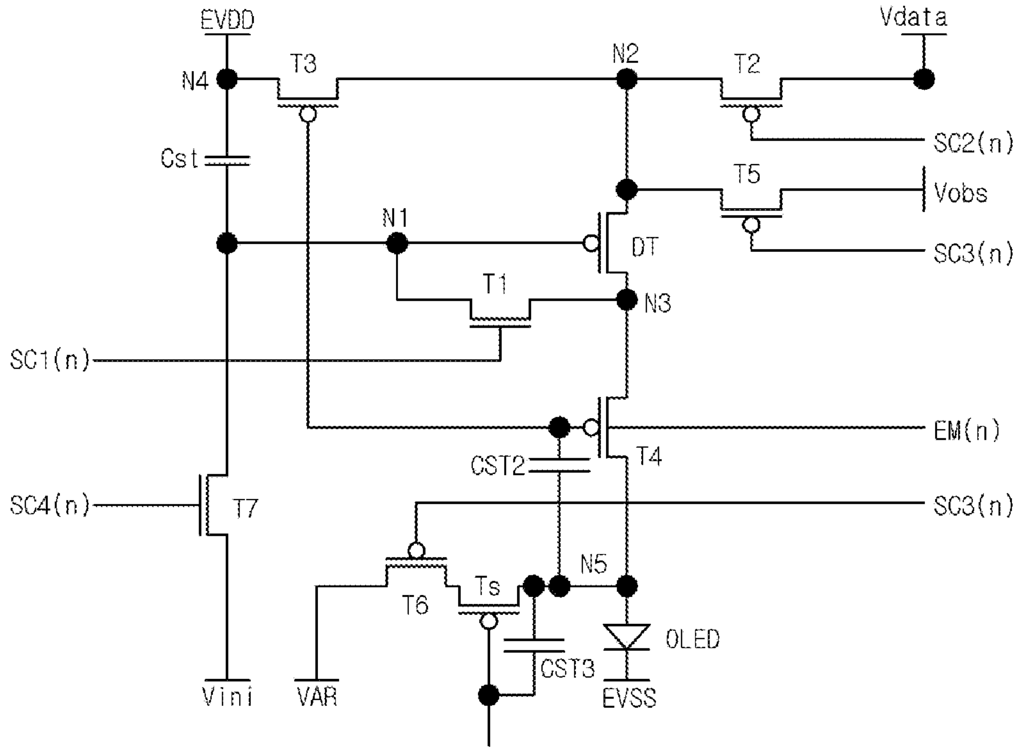
FIG. 8 is a view illustrating a pixel circuit in a display apparatus according to still another aspect of the present disclosure.

FIG. 8 is a view illustrating a pixel circuit in a display apparatus according to still another aspect.

Referring to FIG. 8, FIG. 8 exemplarily illustrates the pixel circuit for description, and the present disclosure is not limited thereto as long as a structure may control the light emission of the light emitting element OLED by receiving the light emitting control signal EM (n). For example, the pixel circuit may include an additional scan signal, a switching thin film transistor connected to the additional scan signal, and a switching thin film transistor to which an additional initialization voltage is applied, and the connection relationship of the switching elements or a connection position of a capacitor may be disposed variously. Hereinafter, for convenience of description, a display apparatus having the pixel circuit structure of FIG. 8 will be described.

Referring to FIG. 8, each of the plurality of pixels P may include a pixel circuit having a driving transistor DT, and a light emitting element OLED connected to the pixel circuit.

The pixel circuit may drive the light emitting element OLED by controlling a driving current flowing in the light emitting element OLED. The pixel circuit may include the driving transistor DT, first to seventh transistors T1 to T7, a compensation transistor Ts, and a capacitor CST. Each of the transistors DT, T1 to T7, and Ts may include a first electrode, a second electrode, and a gate electrode. One of the first electrode and the second electrode may be a source electrode, and the other of the first electrode and the second electrode may be a drain electrode.

Each of the transistors DT, T1 to T7, and Ts may be a p-type thin film transistor or an n-type thin film transistor. In the aspect of FIG. 8, the first transistor T1 and the seventh transistor T7 are the n-type thin film transistors, and the remaining transistors DT, T2 to T6, and Ts are the p-type thin film transistors. However, the present disclosure is not limited thereto, and all or some of the transistors DT, T1 to T7, and Ts may be the p-type thin film transistors or the n-type thin film transistors according to the embodiments. In addition, the n-type thin film transistor may be an oxide thin film transistor, and the p-type thin film transistor may be a polycrystalline silicon thin film transistor.

Hereinafter, an example in which the first transistor T1 and the seventh transistor T7 are the n-type thin film transistors, and the remaining transistors DT, T2 to T6, and Ts are the p-type thin film transistors will be described. Therefore, the first transistor T1 and the seventh transistor T7 are turned on by receiving a high voltage, and the remaining transistors DT, T2 to T6, and Ts are turned on by receiving a low voltage.

According to one example, the first transistor T1 forming the pixel circuit may function as a compensation transistor, the second transistor T2 may function as a data supply transistor, the third and fourth transistors T3 and T4 may function as light emitting control transistors, the fifth transistor T5 may function as a bias transistor, and the sixth and seventh transistors T6 and T7 may function as initialization transistors.

The light emitting element OLED may include an anode electrode and a cathode electrode. The anode electrode of the light emitting element OLED may be connected to a fifth node N5, and the cathode electrode may be connected to the low-potential driving voltage EVSS.

The driving transistor DT may include a first electrode connected to a second node N2, a second electrode connected to a third node N3, and a gate electrode connected to a first node N1. The driving transistor DT may provide a driving current Id to the light emitting element OLED based on a voltage (or a data voltage stored in the capacitor Cst to be described below) at the first node N1.

The first transistor T1 may include a first electrode connected to the first node N1, a second electrode connected to the third node N3, and a gate electrode for receiving a first scan signal SC1(*n*). The first transistor T1 may be turned on in response to the first scan signal SC1(*n*) and diode-connected between the first node N1 and the third node N3 to sample a threshold voltage Vth of the driving transistor DT. The first transistor T1 may be a compensation transistor.

The capacitor Cst may be connected or formed between the first node N1 and a fourth node N4. The capacitor Cst may store or maintain the provided high-potential driving voltage EVDD.

The second transistor T2 may include a first electrode connected to a data line DL (or for receiving the data voltage Vdata), a second electrode connected to the second node N2, and a gate electrode for receiving a second scan signal SC2(*n*). The second transistor T2 may be turned on in response to the second scan signal SC2(*n*) and may transmit the data voltage Vdata to the second node N2. The second transistor T2 may be a data supply transistor.

The third transistor T3 and the fourth transistor T4 (or the first and second light emitting control transistors) may be connected between the high-potential driving voltage EVDD and the light emitting element OLED and may form a current movement path through which the driving current generated by the driving transistor DT moves.

The third transistor T3 may include a first electrode connected to the fourth node N4 and for receiving the high-potential driving voltage EVDD, a second electrode connected to the second node N2, and a gate electrode for receiving the light emitting control signal EM(n).

The fourth transistor T4 may include a first electrode connected to the third node N3, a second electrode connected to the fifth node N5 (or the anode electrode of the light emitting element OLED), and a gate electrode for receiving the light emitting control signal EM(n).

The third and fourth transistors T3 and T4 are turned on in response to the light emitting control signals EM(n), and in this case, the driving current may be provided to the light emitting element OLED, and the light emitting element OLED may emit light with luminance corresponding to the driving current.

The fifth transistor T5 may include a first electrode for receiving a bias voltage Vobs, a second electrode connected to the second node N2, and a gate electrode for receiving the third scan signal SC3(*n*). The fifth transistor T5 may be a bias transistor.

The sixth transistor T6 may include a first electrode for receiving the first initialization voltage VAR, a second electrode connected to the fifth node N5, and a gate electrode for receiving the third scan signal SC3(*n*).

The sixth transistor T6 may be turned on in response to the third scan signal SC3(*n*) before the light emitting element OLED emits light (or after the light emitting element EL emits light) and may initialize the anode electrode (or the pixel electrode) of the light emitting element OLED using the first initialization voltage VAR. The light emitting element OLED may have a parasitic capacitor formed between the anode electrode and the cathode electrode. In addition, while the light emitting element OLED emits light, the parasitic capacitor may be charged so that the anode electrode of the light emitting element OLED may have a specific voltage. Therefore, the amount of charge accumulated in the light emitting element OLED may be initialized by applying the first initialization voltage VAR to the anode electrode of the light emitting element OLED through the sixth transistor T6.

In the specification, the gate electrodes of the fifth and sixth transistors T5 and T6 are formed to commonly receive the third scan signal SC3 (*n*). However, the present disclosure is not necessarily limited thereto, and the gate electrodes of the fifth and sixth transistors T5 and T6 may be formed to be independently controlled by receiving separate scan signals.

The seventh transistor T7 may include a first electrode for receiving the second initialization voltage Vini, a second electrode connected to the first node N1, and a gate electrode for receiving the fourth scan signal SC4(*n*).

The seventh transistor T7 may be turned on in response to the fourth scan signal SC4(*n*) and may initialize the gate electrode of the driving transistor DT using the second initialization voltage Vini. Unnecessary charges may remain in the gate electrode of the driving transistor DT due to the high-potential driving voltage EVDD stored in the capacitor Cst. Therefore, the amount of the remaining charges may be initialized by applying the second initialization voltage Vini to the gate electrode of the driving transistor DT through the seventh transistor T7.

The compensation transistor Ts may be disposed between the sixth transistor T6 and the anode electrode.

The compensation transistor Ts may include a first electrode connected to the second electrode of the sixth transistor T6, a second electrode connected to the anode electrode of the light emitting element OLED, and a gate electrode for receiving the compensation scan signal SCa(n). Before the light emitting period, the compensation transistor Ts may function to cancel the parasitic capacitor CST2 generated by the light emitting control signal EM(n) at the high level. For example, the parasitic capacitor CST2 may be formed between the light emitting control line (see EML in FIG. 1) through which the light emitting control signal EM(n) is provided and the anode electrode. Before the light emitting period, at a time point at which the light emitting control signal EM(n) at the high level is applied, a voltage of the anode electrode of the light emitting element OLED may become higher than a voltage that turns on the light emitting element OLED by the parasitic capacitor CST2. In this case, the light emitting element OLED may unintentionally emit light before the light emitting period.

However, the display apparatus according to one aspect may further include the compensation transistor Ts between the sixth transistor T6 and the anode electrode, and before the light emitting control signal EM (n) at the high level is applied to the third and fourth transistors T3 and T4, the compensation scan signal SCa (n) at the low level may be applied to the compensation transistor Ts. Therefore, the compensation capacitor CST3 may be formed between the compensation scan line through which the compensation scan signal SCa (n) is provided and the anode electrode of the light emitting element OLED. A compensation capacitance of the compensation capacitor CST3 may have a different level from a parasitic capacitance of the parasitic capacitor CST2 to cancel a magnitude of the parasitic capacitance of the parasitic capacitor CST2. Therefore, before the light emitting period, since the compensation capacitor CST3 is formed to sufficiently decrease a voltage of the anode electrode of the light emitting element OLED by the compensation capacitor CST3, by maintaining the voltage of the anode electrode to be lower than the voltage that turns on the light emitting element OLED even when the voltage of the anode electrode of the light emitting element OLED is increased by the parasitic capacitor CST2, it is possible to prevent the light emitting element OLED from unintentionally emitting light before the light emitting period.

Figure 9:
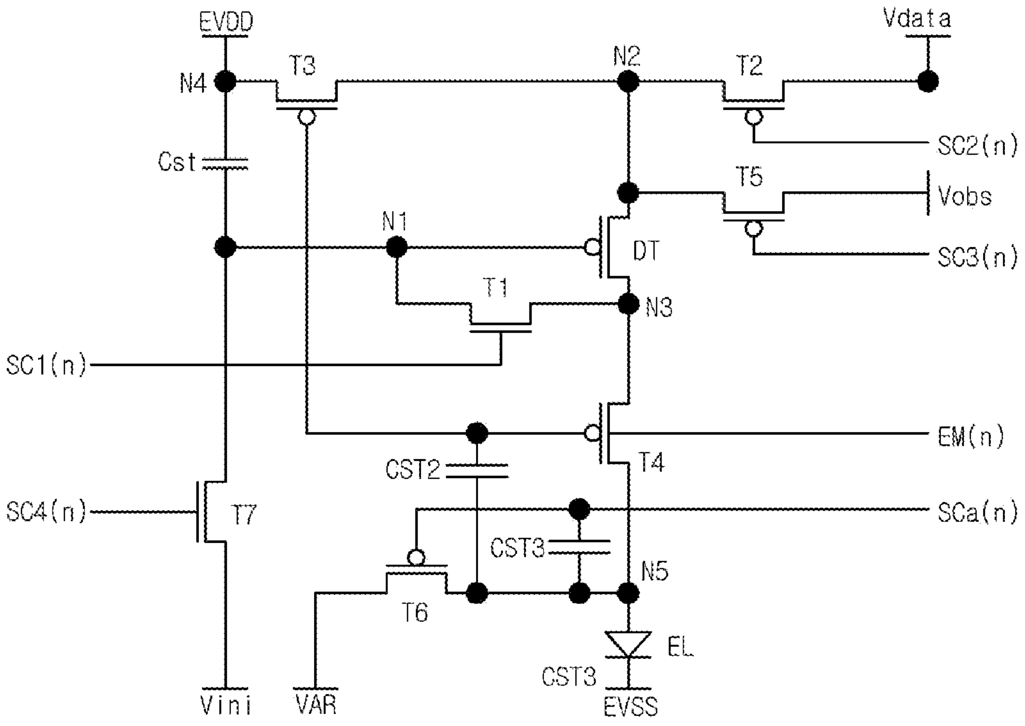
FIG. 9 is a view illustrating a pixel circuit in a display apparatus according to still another aspect of the present disclosure.

FIG. 9 is a view illustrating a pixel circuit in a display apparatus according to still another aspect.

Referring to FIG. 9, the display apparatus according to the aspect differs from the display apparatus of FIG. 8 in that the compensation transistor Ts of FIG. 8 is omitted and the compensation scan signal SCa (n) is applied to the gate electrode of the sixth transistor T6.

Since the remaining descriptions have been made above with reference to FIGS. 1 to 8, detailed description thereof will be omitted below.

For example, a display apparatus includes a driving transistor including a gate electrode, and a first electrode for receiving a high-potential driving voltage and a second electrode for providing a driving current to a light emitting element, a first transistor including a gate electrode to which a light emitting control signal is applied, a first electrode connected to the second electrode of the driving transistor, and a second electrode connected to an anode electrode of the light emitting element, a second transistor including a gate electrode to which the light emitting control signal or a scanning signal is applied, and a first electrode for receiving an initialization voltage and a second electrode, and a compensation transistor including a gate electrode to which a compensation scan signal is applied, a first electrode connected to the second electrode of the second transistor, and a second electrode connected to the anode electrode of the light emitting element, and when the compensation scan signal at a low level is applied, the compensation transistor is turned on.

For example, the first transistor may be turned on when the light emitting control signal at a low level is applied.

For example, a compensation capacitor may be formed between a compensation scan signal line through which the compensation scan signal is supplied and the anode electrode of the light emitting element.

For example, a parasitic capacitor may be formed between the light emitting control signal line through which the light emitting control signal is supplied and the anode electrode of the light emitting element, and the parasitic capacitor may be canceled by the compensation capacitor.

For example, after the compensation scan signal at the low level is applied, the light emitting control signal at the high level may be applied.

For example, in a first period, the compensation scan signal at the low level may be applied, the compensation capacitor may be formed between the compensation scan signal line through which the compensation scan signal is supplied and the anode electrode, and a voltage of the anode electrode may be decreased from a first voltage level to a second voltage level due to the compensation capacitor.

For example, in a second period after the first period, the light emitting control signal at the high level may be applied, and the second transistor may be turned on in response to the light emitting control signal.

For example, in the second period, the parasitic capacitor may be formed between the light emitting control signal line and the anode electrode by the light emitting control signal at the high level, and the voltage of the anode electrode may be increased from the second voltage level to a third voltage level greater than the second voltage level due to the parasitic capacitor.

For example, the third voltage level may be smaller than a turn-on voltage of the light emitting element.

For example, the gate electrode of the driving transistor may receive another scanning signal or an initialization voltage.

For example, in a second period after the first period, the scanning signal at the high level may be applied, and the second transistor is turned on in response to the scanning signal, a parasitic capacitor is formed between the light emitting control signal line and the anode electrode.

For example, a display apparatus may include the driving transistor including the gate electrode, and the first electrode for receiving the high-potential driving voltage and the second electrode for providing the driving current to the light emitting element, the first transistor including the gate electrode to which the light emitting control signal is applied, the first electrode connected to the second electrode of the driving transistor, and the second electrode connected to the anode electrode of the light emitting element, and the second transistor including the gate electrode to which the compensation scan signal is applied, the first electrode for receiving the initialization voltage, and the second electrode connected to the anode electrode, and when the compensation scan signal at the low level is applied, the second transistor may be turned on.

For example, the first transistor may be turned on when the light emitting control signal at the low level is applied.

For example, the compensation capacitor may be formed between the compensation scan signal line through which the compensation scan signal is supplied and the anode electrode of the light emitting element.

For example, the parasitic capacitor may be formed between the light emitting control signal line through which the light emitting control signal is supplied and the anode electrode of the light emitting element, and the parasitic capacitor may be canceled by the compensation capacitor.

For example, the gate electrode of the driving transistor may receive a scanning signal or another initialization voltage.

For example, the display apparatus may comprise a driving transistor including a gate electrode, and a first electrode configured to receive a high-potential driving voltage and a second electrode configured to provide a driving current to a light emitting element; a first transistor including a gate electrode to which a light emitting control signal is applied, a first electrode connected to the second electrode of the driving transistor, and a second electrode connected to an anode electrode of the light emitting element; a second transistor including a gate electrode to which the light emitting control signal or a scanning signal is applied, and a first electrode configured to receive an initialization voltage and a second electrode; and a compensation transistor including a gate electrode to which a compensation scan signal is applied, a first electrode connected to the second electrode of the second transistor, and a second electrode connected to the anode electrode of the light emitting element, wherein the compensation transistor is a p-type thin film transistor.

For example, the display apparatus may comprise a driving transistor including a gate electrode, and a first electrode configured to receive a high-potential driving voltage and a second electrode configured to provide a driving current to a light emitting element; a first transistor including a gate electrode to which a light emitting control signal is applied, a first electrode connected to the second electrode of the driving transistor, and a second electrode connected to an anode electrode of the light emitting element; and a second transistor including a gate electrode to which a compensation scan signal is applied, a first electrode configured to receive an initialization voltage, and a second electrode connected to the anode electrode, wherein the second transistor is a p-type thin film transistor.

Although one aspect has been described above with reference to the accompanying drawings, those skilled in the art to which the present disclosure pertains will be able to understand that the above-described technical configuration of the present disclosure may be carried out in other specific forms without changing the technical spirit or essential features thereof. Therefore, it should be understood that the above-described embodiments are illustrative and not restrictive in all respects. In addition, the scope of the present disclosure is described by the claims to be described below rather than the detailed description. In addition, the meaning and scope of the claims and all changed or modified forms derived from the equivalent concept should be construed as being included in the scope of the present disclosure.

What is claimed is:

1. A display apparatus comprising:

a driving transistor including a gate electrode, and a first electrode configured to receive a high-potential driving voltage and a second electrode configured to provide a driving current to a light emitting element;

a first transistor including a gate electrode to which a light emitting control signal is applied, a first electrode connected to the second electrode of the driving transistor, and a second electrode connected to an anode electrode of the light emitting element;

a second transistor including a gate electrode to which the light emitting control signal or a scanning signal is applied, and a first electrode configured to receive an initialization voltage and a second electrode; and a compensation transistor including a gate electrode to which a compensation scan signal is applied, a first electrode directly connected to the second electrode of the second transistor, and a second electrode connected to the anode electrode of the light emitting element, wherein, when the compensation scan signal at a low level is applied, the compensation transistor is turned on.

2. The display apparatus of claim 1, wherein the first transistor is turned on when the light emitting control signal at a low level is applied.

3. The display apparatus of claim 2, wherein a compensation capacitor is formed between a compensation scan signal line through which the compensation scan signal is supplied and the anode electrode of the light emitting element.

4. The display apparatus of claim 3, wherein a parasitic capacitor is formed between a light emitting control signal line through which the light emitting control signal is supplied and the anode electrode of the light emitting element, and wherein the parasitic capacitor is canceled by the compensation capacitor.

5. The display apparatus of claim 1, wherein, after the compensation scan signal at the low level is applied, the light emitting control signal at the high level is applied.

6. The display apparatus of claim 1, wherein, in a first period, the compensation scan signal at the low level is applied, a compensation capacitor is formed between a compensation scan signal line through which the compensation scan signal is supplied and the anode electrode, and a voltage of the anode electrode is decreased from a first voltage level to a second voltage level due to the compensation capacitor.

7. The display apparatus of claim 6, wherein, in a second period after the first period, the light emitting control signal at the high level is applied, and the second transistor is turned on in response to the light emitting control signal.

8. The display apparatus of claim 7, wherein, in the second period, a parasitic capacitor is formed between the light emitting control signal line and the anode electrode by the light emitting control signal at the high level, and the voltage of the anode electrode is increased from the second voltage level to a third voltage level greater than the second voltage level due to the parasitic capacitor.

9. The display apparatus of claim 8, wherein the third voltage level is smaller than a turn-on voltage of the light emitting element.

10. The display apparatus of claim 6, wherein, in a second period after the first period, the scanning signal at the high level is applied, and the second transistor is turned on in response to the scanning signal, a parasitic capacitor is formed between the light emitting control signal line and the anode electrode.

11. The display apparatus of claim 1, wherein the gate electrode of the driving transistor receives another scanning signal or an initialization voltage.

12. A display apparatus comprising:

a driving transistor including a gate electrode, and a first electrode configured to receive a high-potential driving voltage and a second electrode configured to provide a driving current to a light emitting element;

a first transistor including a gate electrode to which a light emitting control signal is applied, a first electrode connected to the second electrode of the driving transistor, and a second electrode connected to an anode electrode of the light emitting element;

a second transistor including a gate electrode to which a compensation scan signal is applied, a first electrode configured to receive an initialization voltage, and a second electrode connected to the anode electrode; and a compensation capacitor is formed between a compensation scan signal line through which the compensation scan signal is supplied and the anode electrode of the light emitting element, wherein the compensation capacitor is directly connected between the gate electrode of the second transistor and the second electrode of the second transistor, wherein when the compensation scan signal at a low level is applied, the second transistor is turned on.

13. The display apparatus of claim 12, wherein the first transistor is turned on when the light emitting control signal at a low level is applied.

14. The display apparatus of claim 12, wherein a parasitic capacitor is formed between a light emitting control signal line through which the light emitting control signal is supplied and the anode electrode of the light emitting element, and wherein the parasitic capacitor is canceled by the compensation capacitor.

15. The display apparatus of claim 12, wherein the gate electrode of the driving transistor receives a scanning signal or another initialization voltage.

16. A display apparatus comprising:

a driving transistor including a gate electrode, and a first electrode configured to receive a high-potential driving voltage and a second electrode configured to provide a driving current to a light emitting element;

a first transistor including a gate electrode to which a light emitting control signal is applied, a first electrode connected to the second electrode of the driving transistor, and a second electrode connected to an anode electrode of the light emitting element;

a second transistor including a gate electrode to which the light emitting control signal or a scanning signal is applied, and a first electrode configured to receive an initialization voltage and a second electrode; and a compensation transistor including a gate electrode to which a compensation scan signal is applied, a first electrode directly connected to the second electrode of the second transistor, and a second electrode connected to the anode electrode of the light emitting element, wherein the compensation transistor is a p-type thin film transistor.

17. A display apparatus comprising:

a driving transistor including a gate electrode, and a first electrode configured to receive a high-potential driving voltage and a second electrode configured to provide a driving current to a light emitting element;

a first transistor including a gate electrode to which a light emitting control signal is applied, a first electrode connected to the second electrode of the driving transistor, and a second electrode connected to an anode electrode of the light emitting element;

a second transistor including a gate electrode to which a compensation scan signal is applied, a first electrode configured to receive an initialization voltage, and a second electrode connected to the anode electrode; and a compensation capacitor is formed between a compensation scan signal line through which the compensation scan signal is supplied and the anode electrode of the light emitting element, wherein the compensation capacitor is directly connected between the gate electrode of the second transistor and the second electrode of the second transistor, wherein the second transistor is a p-type thin film transistor.

* * * * *